United States Patent [19]
Kolchinsky

[11] Patent Number: 6,161,585
[45] Date of Patent: Dec. 19, 2000

[54] HIGH FLOW PROPORTIONAL PRESSURE REDUCING VALVE

[75] Inventor: Abel E. Kolchinsky, Riverwoods, Ill.

[73] Assignee: Sterling Hydraulics, Inc., Schaumburg, Ill.

[21] Appl. No.: 09/277,433

[22] Filed: Mar. 26, 1999

[51] Int. Cl.$^7$ .................................................. F15B 13/044
[52] U.S. Cl. ............................... 137/625.65; 137/625.68; 251/129.07
[58] Field of Search .......................... 137/625.65, 625.68; 251/129.07

[56] References Cited

U.S. PATENT DOCUMENTS

| | | | |
|---|---|---|---|
| 4,643,225 | 2/1987 | Imhof .............................. | 137/625.65 X |
| 5,191,827 | 3/1993 | Kervagoret ..................... | 137/625.65 X |
| 5,251,671 | 10/1993 | Hiroki ................................ | 137/625.65 |
| 5,299,600 | 4/1994 | Aronovich ......................... | 137/625.65 |
| 5,377,720 | 1/1995 | Stobbs et al. ..................... | 137/625.65 |
| 5,577,534 | 11/1996 | Ward .............................. | 137/625.65 X |
| 5,592,972 | 1/1997 | Niethammer ...................... | 137/625.65 |
| 5,853,028 | 12/1998 | Ness et al. ......................... | 137/625.65 |
| 5,894,860 | 4/1999 | Baldauf et al. ..................... | 137/625.65 |

Primary Examiner—Gerald A. Michalsky
Attorney, Agent, or Firm—Wood, Phillips, VanSanten, Clark & Mortimer

[57] ABSTRACT

A proportional solenoid operated pressure reducing control valve includes an elongate cylindrical housing having an axial throughbore between an outer end and an inner end defining an interior chamber. The inner end is receivable in a solenoid, in use. A plurality of axially spaced side port openings proximate the outer end define a cylinder port and a pressure port. A tank opening proximate the outer end defines a tank port. A valve member comprises a cylindrical body movable in the chamber at the outer end for selectively controlling fluid flow through the interior chamber between the tank port and the cylinder port in a neutral position, or modulating the cylinder port between the pressure port and the tank port in a regulated position. The valve member includes an axially extending throughbore. Dividing means in the valve member separate the valve member throughbore to define an outer chamber and a control chamber. A solenoid plunger is movable in the interior chamber at the inner end and is operatively associated with the valve member for positioning the valve member responsive to energization of a solenoid, in use. The valve member further comprises a first passage therethrough providing fluid communication between the outer chamber and the interior chamber to provide a drain to the tank port, and a second passage therethrough opening into the control chamber providing fluid communication between the cylinder port and the control chamber so that control pressure from the pressure port acts only on the dividing means of the valve member.

25 Claims, 5 Drawing Sheets

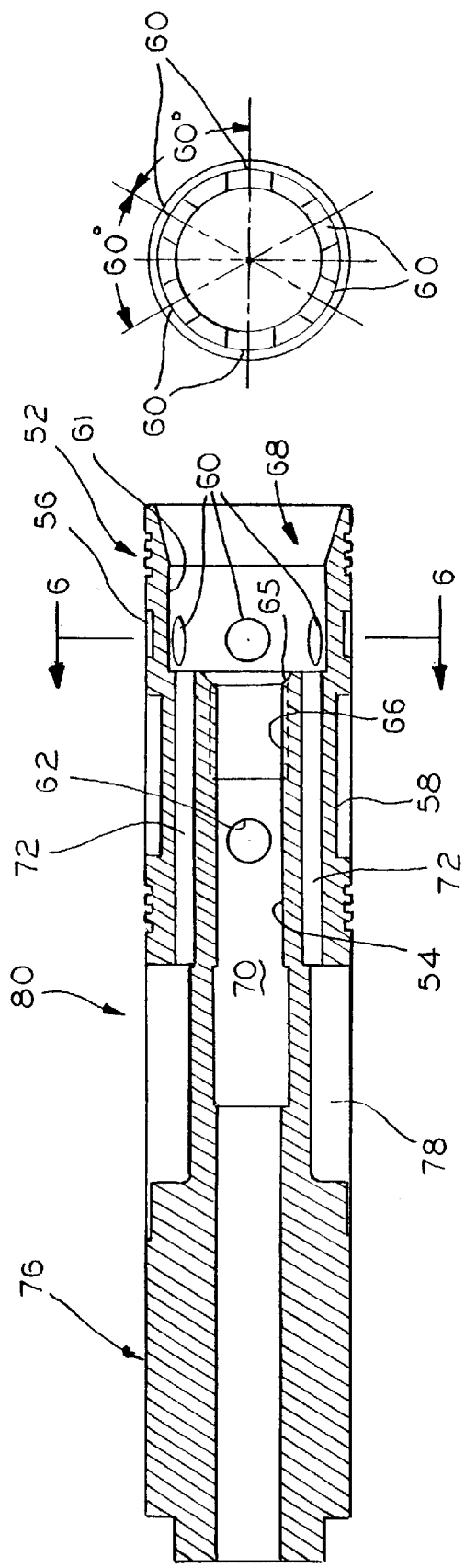

HIGH FLOW PROPORTIONAL PRESSURE REDUCING VALVE

FIELD OF THE INVENTION

This invention relates to control valves and, more particularly, to an analog proportional pressure control three-way valve for high flow applications.

BACKGROUND OF THE INVENTION

In one form of a fluid pressure control valve, a flow control element, such as a spool or valve member, is movably positioned in a valve chamber between first and second valve positions for selectively fluidically coupling valve ports. The spool member may be directly actuated by a movable armature or plunger. A solenoid controllably positions the plunger, which results in movement of the spool from a neutral position to an actuated position. Typically, a coil spring is used for biasing the spool to the neutral position. Energization of the solenoid coil produces a magnetic force acting on the plunger which is related to a gap between the plunger and a stop. This relationship is represented by a curve in which force is generally inversely proportional to gap. With an on/off type valve, the magnetic force exceeds the opposing spring and flow forces to provide continuous movement of the plunger to a fully actuated position.

With a proportional type valve, it is necessary to control the plunger to stop at intermediate positions. An example of such a proportional valve is shown in Kolchinsky, U.S. Pat. No. 4,790,345. This patent shows a valve housing including a sleeve having first and second tube portions connected by a non-magnetic bridge. The mating surface of the bridge and tube portions are conical. This construction changes magnetic behavior as by modifying the above-described curve to provide constant force during the portion of the stroke at which the plunger is at an axial position corresponding to position of the bridge. As a result, the plunger moves until the magnetic force is balanced with the spring and flow forces so that the plunger stops at an intermediate position. As is known, the magnetic force depends on voltage applied to the coil. Thus, by varying coil voltage the stop position varies. Thus, movement of the spool can be controlled to regulate flow by varying input voltage.

In the case of a pressure control valve, a similar tube is used. However, the force of the pressure differential over the cross section of the spool cross section opposes the magnetic force. Therefore, the larger the diameter of the spool, the larger the required magnetic force.

Aronovich, U.S. Pat. No. 5,299,600, owned by the assignee of the present application, discloses an analog proportional pressure control three-way valve. The three-way valve disclosed therein uses a pressure dividing circuit that divides regulated pressure between an outlet and end port opening in a regulated position to create an intermediate pressure to balance force from the solenoid. For use in high flow applications, such a valve spool needs a large spool diameter. However, control pressure acts on the entire cross-sectional area of the valve, requiring larger magnetic forces and thus solenoid coil size.

The present invention overcomes one or more of the problems discussed above.

SUMMARY OF THE INVENTION

In accordance with the invention a proportional valve is disclosed in which control pressure acts on a reduced area of a valve spool.

There is disclosed in accordance with one aspect of the invention a proportional solenoid operated pressure reducing control valve. The control valve includes an elongate cylindrical housing having an axial throughbore between an outer end and an inner end defining an interior chamber. The inner end is receivable in a solenoid, in use. A plurality of axially spaced side port openings proximate the outer end define a cylinder port and a pressure port. A tank opening proximate the outer end defines a tank port. A valve member comprises a cylindrical body movable in the chamber at the outer end for selectively controlling fluid flow through the interior chamber between the tank port and the cylinder port in a neutral position, or the cylinder port is modulating between the pressure port and the tank port in a regulated position. At a certain point of the input electrical signal the cylinder port is connected to the pressure port only. The valve member includes an axially extending throughbore. Dividing means in the valve member separate the valve member throughbore to define an outer chamber and a control chamber. A solenoid plunger is movable in the interior chamber at the inner end and is operatively associated with the valve member for positioning the valve member responsive to energization of a solenoid, in use. The valve member further comprises a first passage therethrough providing fluid communication between the outer chamber and the interior chamber to provide a drain to the tank port, and a second passage therethrough opening into the control chamber providing fluid communication between the cylinder port and the control chamber so that control pressure from the pressure port acts only on the dividing means of the valve member.

It is a feature of the invention that the plunger includes an axial through opening, and a stop is mounted to the housing at the inner end. A pin extends longitudinally in the interior chamber from the stop and through the plunger axial through opening into the control chamber. Bias means in the control chamber between the dividing means and the pin bias the valve member outwardly in the neutral position. The control chamber has a diameter slightly larger than a diameter of the pin, and the control pressure acts on the diameter of the control chamber.

It is another feature of the invention that the dividing means comprises a threaded plug in the form of a set screw.

It is a further feature of the invention to provide a stationary armature mounted to the housing at the inner end.

It is still another feature of the invention that the valve member is integrally formed with the solenoid plunger.

It is an additional feature of the invention that the valve member is self-guided in the housing throughbore only, without being guided in the tube bore, which eliminates potential concentricity problems associated with manufacturing of cartridge valves.

In one embodiment of the invention, the tank port opening comprises an axial end opening at the outer end.

In another embodiment of the invention, the tank opening comprises a plurality of side port openings in the cylindrical housing.

It is still a further feature of the invention to provide a plug closing the outer end of the housing.

It is still a further feature of the invention to provide a filter on the pressure port.

There is disclosed in accordance with another aspect of the invention a proportional solenoid operated pressure reducing control valve. The control valve includes an elongate cylindrical housing having an axial throughbore between an outer end and an inner end defining an interior chamber. The inner end is receivable in a solenoid, in use. A plurality of axially spaced side port openings proximate the outer end define a cylinder port and a pressure port. A tank opening proximate the outer end defines a tank port. A valve member is movable in the chamber at the outer end for selectively controlling fluid flow through the interior chamber between the tank port and the cylinder port in a neutral position, or modulating the cylinder port between the pressure port and the tank port in a regulated position. The valve member includes an axially extending throughbore. Dividing means in the valve chamber separate the valve member throughbore to define an outer chamber and a control chamber. A solenoid plunger is movable in the interior chamber at the inner end and is operatively associated with the valve member for positioning the valve member. The plunger includes an axial through opening. A stop is mounted to the housing at the inner end. A pin extends longitudinally in the interior chamber from the stop and through the plunger axial through opening into the control chamber. A spring in the control chamber between the dividing means and the pin biases the valve member outwardly in the neutral position. The valve member includes a first passage therethrough providing fluid communication between the outer chamber and the interior chamber to provide a drain to the tank port and a second passage therethrough opening into the control chamber providing fluid communication between the cylinder port and the control chamber so that control pressure from the pressure port acts only on the dividing means of the valve member.

It is still another feature of the invention that the set screw is selectively adjusted to set spring bias pressure.

Further features and advantages of the invention will be readily apparent from the specification and from the drawings.

BRIEF DESCRIPTION OF THE DRAWINGS

FIG. 5 is a sectional view of a plunger and spool sub-assembly of the valve of FIG. 4;

FIG. 6 is a sectional view taken along the line 6—6 of FIG. 5;

DETAILED DESCRIPTION OF THE INVENTION

Figure 1:
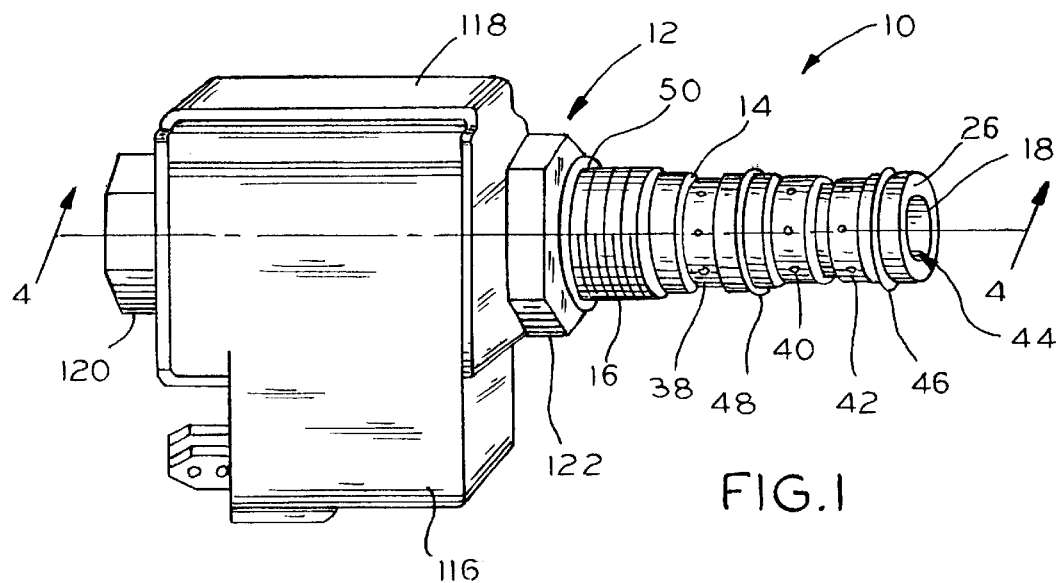
FIG. 1 is a perspective view of an analog proportional control three-way valve according to the invention.
Figure 2:
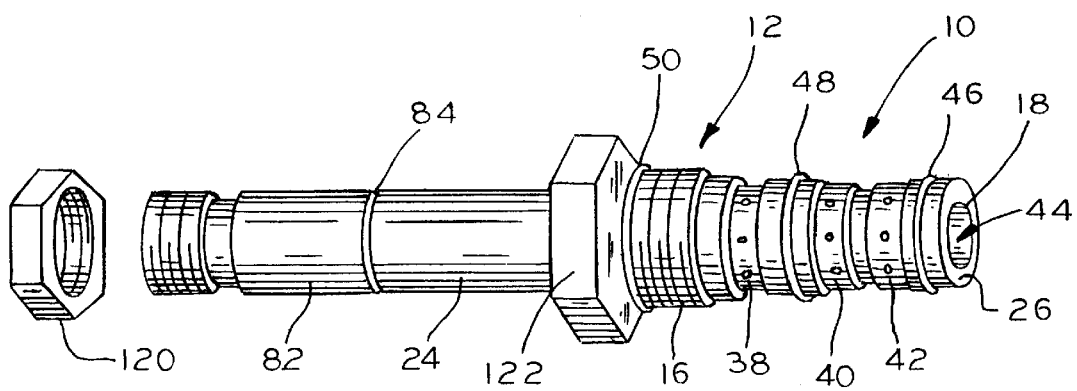
FIG. 2 is an exploded view of the valve of FIG. 1 with the solenoid removed.

FIG. 1 illustrates an analog proportional pressure control three-way cartridge valve 10 according to a first embodiment of the invention. The valve includes a stationary valve housing 12 including a housing or sleeve 14 with an integral thread 16 to be screwed into a fluid port (not shown).

Figure 4:
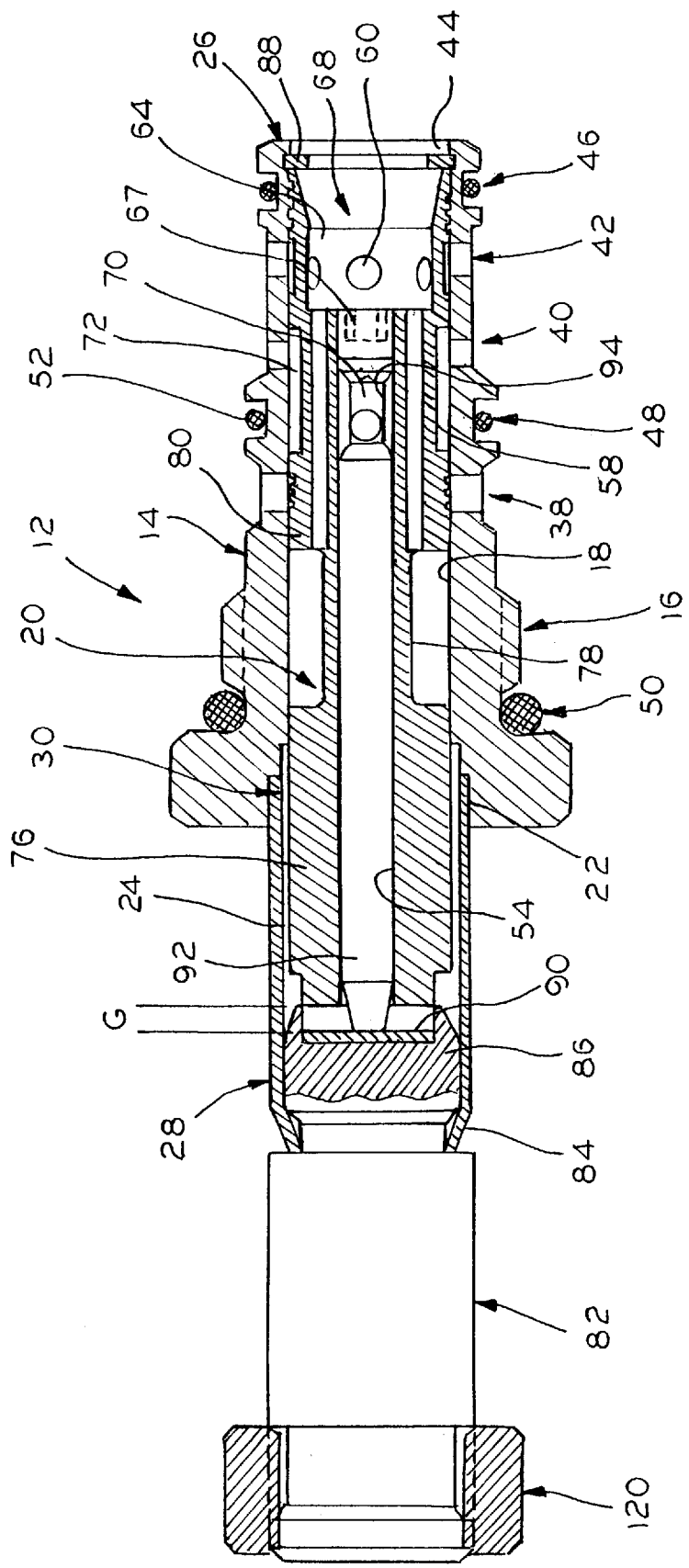
FIG. 4 is a sectional view taken along the line 4—4 of FIG. 1.

With reference also to FIG. 4, the housing 14 is of an elongate, one-piece cylindrical construction having an axial throughbore 18 defining an interior chamber 20. The housing 14 includes an inner end counterbore 22 receiving a non-magnetic tube 24 which also forms part of the interior chamber 20. The interior chamber 20 extends between an outer end 26 and an inner end 28 of the combined length of valve housing 12 and tube 24. The tube 24 is also of a non-magnetic material. The tube 24 is secured within the counterbore 22 using a thread with Perma-Lok sealant as at 30.

As used herein, the relative term "outer" or "outward" refers to a direction axially toward the outer end 26. The relative term "inner" or "inward" refers to a direction axially away from the outer end 26, i.e., axially toward the inner end 28.

The valve housing 14 is provided with three axially spaced groups of circumferentially spaced side ports or openings 38, 40 and 42 that open radially inwardly into the interior chamber 20. An outer end of the bore 18 comprises an end port 44. A first sealing ring 46 is provided on the valve housing 22 for sealing the end port 44 from the ports 38, 40 and 42. A second sealing ring 48 is provided between the first and second group of openings 38 and 40 for sealing the same from one another. A third sealing ring 50 seals the valve 10 within the fluid port.

A plunger and spool sub-assembly 80 includes a flow control element such as a spool or valve member 52 and is movable in the interior chamber 20 for selectively fluidically coupling the port openings 38, 40, 42 and 44. Particularly, and with reference also to FIGS. 5 and 6, the sub-assembly 80, including the valve member 52, is of cylindrical construction including an axial throughbore 54. The outer diameter of the sub-assembly 80 is slightly less than the inner diameter of the valve housing axial bore 18. Thus, the sub-assembly 80 is self-guided in the housing honed bore 18 to provide a centerless ground. The sub-assembly 80 is not guided in the tube 24, which eliminates potential concentricity problems associated with manufacture of cartridge values. There is no guiding element required.

A first annular circumferential groove 56 is provided proximate an outer end of the valve member 52. An elongate circumferential annular groove 58 is positioned just inwardly of the first groove 56. A plurality of circumferentially spaced openings 60 open radially inwardly from the first groove 56 into the throughbore 54. A single orifice 62 opens radially inwardly from the elongate groove 58 into the throughbore 54. The axial throughbore 54 widens at a counterbore 64 at the outer end to define a shoulder 65. The throughbore 54 is threaded as at 66 immediately inwardly of the shoulder 65 to receive a threaded plug 67 in the form of a set screw. The set screw 67 separates the throughbore 54 to define an outer chamber 68 and a control chamber 70.

Figure 3:
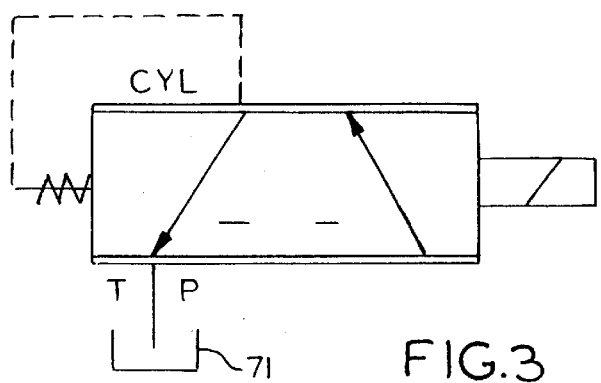
FIG. 3 is a hydraulic schematic of the valve of FIG. 1.

In the neutral valve position, as illustrated in FIG. 4, the end port 44 is connected through the valve member counterbore 64 and openings 60 to the third port openings 42. When actuated, the valve member 52 moves inwardly to cover the third port openings 42 and the elongate annular groove 58 provides fluidic coupling through the interior chamber 18 between the first openings 38 and the second openings 40. Particularly, the amount of movement of the valve member 52 is controlled to control overlap between the first openings 38 and the groove 58 to regulate flow to the second openings 40. Typically, in an application for controlling a single acting cylinder, the end port 44 is connected to a tank 71, see FIG. 3, to define a tank port. The first port openings 38 serve as an inlet connected to a source of pressure, such as a pump P, and define a pressure port. The second and third openings 40 and 42 serve as an outlet connected to a cylinder and thus define a cylinder port. Thus, in a neutral position, the cylinder is evacuated to the tank 71. In the regulated position, the cylinder modulates between the pressure source and the tank.

The valve member 52 further comprises a plurality of first passages 72 extending axially therethrough radially outwardly of the throughbore 72. The first passages 54 provide fluid communication between the outer chamber 68 and the housing interior chamber 20 to provide a drain to the end or tank port 44. The orifice opening 62 acts as a second passage through the valve member 52 opening into the control chamber 70 and providing fluid communication between the cylinder port defined by the second port openings 40 and the control chamber 70 so that control pressure from the pressure port defined by the first port openings 38 act only on the set screw 67, as described more specifically below.

The plunger and spool sub-assembly 80 also includes an integrally formed movable armature or plunger 76 which is thus positioned in the chamber 20 at the inner end 28. The axial throughbore 54 extends through the plunger 76. An annulus opening 78 separates the plunger 76 from valve member 52.

The tube 24 is crimped, at the inner end 28, to a stationary armature 82 as at 84. The stationary armature 82 includes a stop 86 received within the tube 24 that acts as a stop for the plunger 76. Thus, the plunger and spool sub-assembly 80 is captured in the interior chamber 20 between the stop 86 and a retaining ring 88 at the outer end 26. A so-called shading shim 90 made of non-magnetic material is received in the stop 86. An elongate cylindrical pin 92 extends through the valve member throughbore 54. The pin 92 abuts the shim 90 and extends through the plunger 76 into the control chamber 70. A spring 94 in the control chamber 70 extends between the set screw 67 and the pin 92. The spring 94 biases the valve member 52 outwardly into the neutral position against the retaining ring 88. The set screw 67 is selectively adjusted to set spring bias pressure. The shim 90 prevents contact between the plunger 76 and the stop 86, which reduces solenoid holding force at the completion of the spool stroke and thus optimizes the slope of the force versus stroke curve.

In the described configuration, a gap G, see FIG. 4, is provided between the stop 86 and the plunger section 76. The gap G represents the distance between the plunger section 76 and the stop 86, less the thickness of the shading shim 90.

In order to actuate the valve 10, a solenoid coil 116, surrounded by a metal yoke 118, is received around the tube 24 and stationary armature 82. A nut 120 is threaded at an inner end of the stationary armature 82 and retains the solenoid 116 positioned between the nut 120 and a coupling nut portion 122 of the valve housing 14 intermediate the outer end 26 and the inner end 28.

When the solenoid 116 is energized, it develops a magnetic force in space occupied by the stationary armature 82 and the plunger 76. The magnetic force moves the sub-assembly 80 against the spring force. As the plunger and spool sub-assembly 80 moves toward the stationary armature 82, the flow from the pressure port 38 enters into the circumferential annular groove 58 and then through the cross hole 62 and fills the control chamber 70. This control pressure acts on the bottom of the spool bore 54, which actual area is equivalent to that of the pin 92 cross-sectional area. This pressure force opposes the solenoid force. As the electrical signal increases the control pressure proportionally increases and therefore two opposite forces are balanced at the new spool position. If the valve member 52 overshoots toward the solenoid forces, then the corresponding pressure forces return the valve member 52 to the position where both solenoid forces and pressure forces are balanced. This interaction between solenoid and pressure forces provide feedback. Unlike conventional pressure reducing valves of this type, where pressure is acting on full area of the spool cross-section, this valve design provides reduced actual area, i.e., the cross-sectional area of the pin 92, which in turn reduces the pressure forces and in turn allows use of a smaller solenoid.

In accordance with the invention, the valve 10 is adapted to be used in high flow applications up to, approximately, eight gallons per minute. This requires a relatively large diameter spool. Indeed, the valve member 52 has an outer diameter of approximately 0.4 inches. The axial throughbore 54 is approximately ⅛ of an inch, with the diameter of the pin 94 similarly being approximately ⅛ of an inch. Leakage around the pin 92 and radially outwardly of the sub-assembly 80 is drained via the annulus opening 78 and the first passages 72 to the tank port 44. Fluid pressure from the pressure port defined by the first openings 38 acts only on the set screw 67 within the control chamber 70. Thus, the control pressure acts only on a size corresponding to that of the diameter of the pin 92, which corresponds to the diameter of the set screw 67. Thus, the control pressure acts on a relatively small diameter.

Figure 7:
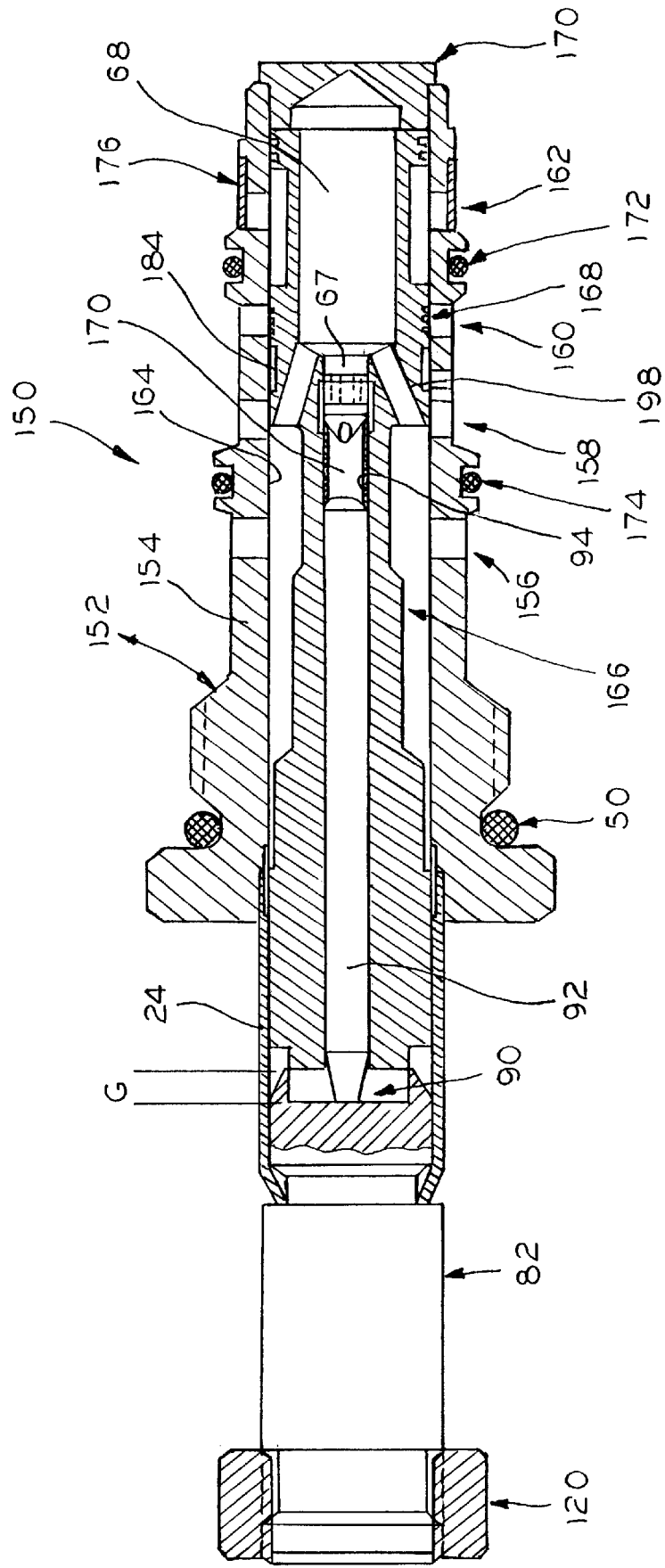
FIG. 7 is a sectional view, similar to that of FIG. 4, for an analog proportional pressure control three-way valve according to a second embodiment of the invention.

Referring to FIG. 7, an analog proportional pressure control three-way valve 150 according to a second embodiment of the invention is illustrated. The valve 150 includes a stationary valve housing assembly 152 including a valve housing 154 and tube 24. For simplicity herein, where like elements are used relative to the embodiment of FIG. 4, like reference numerals are used. The tube 24 is crimped to a stationary armature 82 which threadably receives a nut 120.

The valve housing 154 is provided with four axially spaced groups of circumferentially spaced side ports or openings 156, 158, 160 and 162. An axial throughbore 164 defines an interior chamber 166. A plunger and spool sub-assembly 167 including an integral valve member 168 is received in the interior chamber 166 between the movable armature 82 and an outer end plug 170. A first sealing ring 172 is provided on the valve housing 154 for sealing the ports 162 from the ports 156, 158 and 160. A second sealing ring 174 is provided between the first and second groups of openings 156 and 158 for sealing the same from one another. A filter 176 is provided on the valve housing 154 over the fourth group of openings 162. The valve member 168 is movable in the interior chamber 166 for selectively fluidically coupling the port openings 156, 158, 160 and 162.

Figure 9:
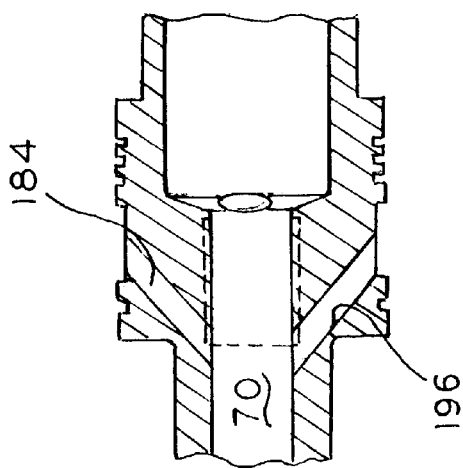
FIG. 9 is a partial sectional view taken along the line 9—9 of FIG. 8.
Figure 8:
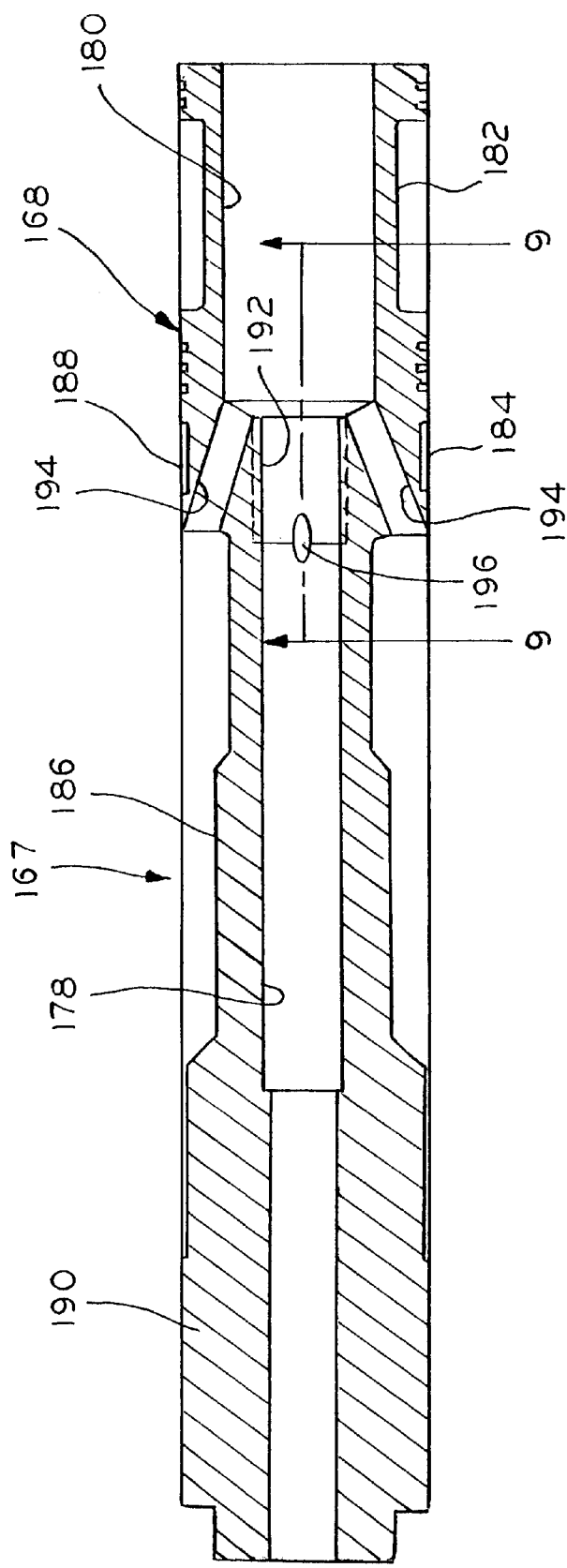
FIG. 8 is a sectional view of plunger and spool sub-assembly of the valve of FIG. 7.

With reference also to FIGS. 8 and 9, the sub-assembly 167 is of cylindrical construction including an axial throughbore 178 and outer end counterbore 180. The outer diameter of the valve member 168 is slightly less than the inner diameter of the valve housing axial throughbore 164. An elongate annular circumferential groove 182 is provided centrally surrounding the counterbore 180. A second annular circumferential groove 184 is provided inwardly of the elongate groove 182. An annulus groove 186 separates the valve member 168 from a plunger 190.

The throughbore 178 is threaded as at 192 immediately inwardly of the counterbore 180. The threaded portion 192 is adapted to receive the set screw 67.

In a neutral valve position, as illustrated in FIG. 7, the valve member 168 is biased outwardly by the spring 94 against the plug 170. In this configuration the first group of openings 156 define a tank port and are connected to the tank 71 in the schematic of FIG. 3. The second group of openings 158 and third group of openings 160 define a cylinder port. The fourth group of openings 162 define a pressure port. In the neutral position, the tank port 156 is fluidically connected to the second group of openings 158, defining the cylinder port.

The valve member 168 includes a pair of angled first passages 194 that connect the outer chamber 68 to the interior chamber 166 to act as a drain. A second passage 196, see FIG. 9, extends from the control chamber 70 to the second annular groove 184. An additional side port opening 198 is provided axially between the second group of openings 158 and third group of openings 160 aligned with the second axial group 184. The opening 198 maintains a constant connection via the second passage 196 with the control chamber 70.

When actuated, the valve member 168 moves inwardly to cover the second group of openings 158 and the elongate annular groove 182 provides fluidic coupling through the interior chamber 166 between the third group of openings 160, the cylinder port, and the fourth group of openings 162, the pressure port. Thus, the cylinder port 160 is modulated between the pressure port 162 and the tank port 156, as above.

As with the embodiment of FIGS. 1–6, the smaller control area provided by the set screw 67 is the only area on which the control pressure acts against. Pressure is otherwise drained to the tank.

Thus, in accordance with the invention there is provided an analog proportional pressure reducing valve using a smaller control area. Particularly, using a pin inserted inside of a spool, the control pressure is not acting against the spool diameter, but rather against the pin diameter. This provides for a high flow valve design using a large diameter spool with low control pressure.

I claim:

1. A proportional solenoid operated pressure reducing control valve comprising:
    an elongate cylindrical housing having an axial throughbore between an outer end and an inner end defining an interior chamber, the inner end being receivable in a solenoid, in use, a plurality of axially spaced side port openings proximate the outer end defining a cylinder port and a pressure port, and a tank opening proximate the outer end defining a tank port;
    a valve member comprising a cylindrical body movable in the chamber at the outer end for selectively controlling fluid flow through the interior chamber between said tank port and said cylinder port in a neutral position or the cylinder port is modulating between said pressure port and said tank port in a regulated position, the valve member including an axially extending throughbore;
    dividing means in the valve member for separating the valve member throughbore to define an outer chamber and a control chamber; and
    a solenoid plunger, movable in the interior chamber at the inner end, operatively associated with the valve member for positioning the valve member responsive to energization of a solenoid, in use,
    the valve member further comprising a first passage therethrough providing fluid communication between the outer chamber and the interior chamber to provide a drain to the tank port and a second passage therethrough opening into the control chamber providing fluid communication between the cylinder port and the control chamber so that control pressure from the pressure port acts only on the dividing means of the valve member.

2. The control valve of claim 1 wherein the plunger includes an axial through opening, and further comprising a stop mounted to the housing at the inner end and a pin extending longitudinally in the interior chamber from the stop and through the plunger axial through opening into the control chamber.

3. The control valve of claim 2 further comprising bias means in the control chamber between the dividing means and the pin for biasing the valve member outwardly in the neutral position.

4. The control valve of claim 2 wherein said control chamber has a diameter slightly larger than a diameter of the pin and the control pressure acts on the diameter of the control chamber.

5. The control valve of claim 1 wherein the dividing means comprises a threaded plug.

6. The control valve of claim 1 wherein the dividing means comprises a set screw.

7. The control valve of claim 1 further comprising a stationary armature mounted to the housing at the inner end.

8. The control valve of claim 1 wherein the valve member is integrally formed with the solenoid plunger.

9. The control valve of claim 1 wherein the valve member is self guided in the housing throughbore.

10. The control valve of claim 1 wherein the tank port opening comprises an axial end opening at the outer end.

11. The control valve of claim 1 wherein the tank opening comprises a plurality of side port openings in the cylindrical housing.

12. The control valve of claim 1 further comprising a plug closing the outer end of the housing.

13. The control valve of claim 1 further comprising a filter on the pressure port.

14. A proportional solenoid operated pressure reducing control valve comprising:
    an elongate cylindrical housing having an axial throughbore between an outer end and an inner end defining an interior chamber, the inner end being receivable in a solenoid, in use, a plurality of axially spaced side port openings proximate the outer end defining a cylinder port and a pressure port, and a tank opening proximate the outer end defining a tank port;
    a valve member movable in the chamber at the outer end for selectively controlling fluid flow through the interior chamber between said tank port and said cylinder port in a neutral position or modulating the cylinder port between said pressure port and said tank port in a regulated position, the valve member including an axially extending throughbore;
    dividing means in the valve member for separating the valve member throughbore to define an outer chamber and a control chamber;
    a solenoid plunger, movable in the interior chamber at the inner end, operatively associated with the valve member for positioning the valve member, the plunger including an axial through opening;
    a stop mounted to the housing at the inner end;
    a pin extending longitudinally in the interior chamber from the stop and through the plunger axial through opening into the control chamber;
    a spring in the control chamber between the dividing means and the pin for biasing the valve member outwardly in the neutral position;

the valve member further comprising a first passage therethrough providing fluid communication between the outer chamber and the interior chamber to provide a drain to the tank port and a second passage therethrough opening into the control chamber providing fluid communication between the cylinder port and the control chamber so that control pressure from the pressure port acts only on the dividing means of the the valve member.

15. The control valve of claim 14 wherein said control chamber has a diameter slightly larger than a diameter of the pin and the control pressure acts on the diameter of the control chamber.

16. The control valve of claim 14 wherein the dividing means comprises a threaded plug.

17. The control valve of claim 14 wherein the dividing means comprises a set screw.

18. The control valve of claim 17 wherein the set screw is selectively adjusted to set spring bias pressure.

19. The control valve of claim 14 further comprising a stationary armature mounted to the housing at the inner end.

20. The control valve of claim 14 wherein the valve member is integrally formed with the solenoid plunger.

21. The control valve of claim 14 wherein the valve member is self guided in the housing throughbore.

22. The control valve of claim 14 wherein the tank port opening comprises an axial end opening at the outer end.

23. The control valve of claim 14 wherein the tank opening comprises a plurality of side port openings in the cylindrical housing.

24. The control valve of claim 14 further comprising a plug closing the outer end of the housing.

25. The control valve of claim 14 further comprising a filter on the pressure port.

* * * * *